United States Patent
Hayashi et al.

(10) Patent No.: US 8,249,754 B2
(45) Date of Patent: Aug. 21, 2012

(54) WIND TURBINE GENERATOR AND YAW DRIVING METHOD FOR WIND TURBINE GENERATOR

(75) Inventors: Yoshiyuki Hayashi, Nagasaki (JP); Masaaki Shibata, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 276 days.

(21) Appl. No.: 12/517,271

(22) PCT Filed: May 8, 2008

(86) PCT No.: PCT/JP2008/058559
§ 371 (c)(1), (2), (4) Date: Jun. 2, 2009

(87) PCT Pub. No.: WO2008/143009
PCT Pub. Date: Nov. 27, 2008

(65) Prior Publication Data
US 2010/0087960 A1    Apr. 8, 2010

(30) Foreign Application Priority Data

May 21, 2007   (JP) .................. 2007-133830

(51) Int. Cl.
*F03D 7/04* (2006.01)
*G06F 19/00* (2011.01)

(52) U.S. Cl. ............... 700/287; 416/1; 416/31; 416/37; 290/44

(58) Field of Classification Search .......... 700/286, 700/287; 416/1, 37, 11, 24, 132 B; 290/44
See application file for complete search history.

(56) References Cited

U.S. PATENT DOCUMENTS

| | | | |
|---|---|---|---|
| 4,297,076 A * | 10/1981 | Donham et al. | 416/37 |
| 2004/0081551 A1 | 4/2004 | Wobben | |
| 2006/0002792 A1 * | 1/2006 | Moroz et al. | 416/1 |
| 2007/0212209 A1 * | 9/2007 | Borgen | 415/1 |
| 2009/0047129 A1 | 2/2009 | Yoshida | |
| 2010/0014969 A1 * | 1/2010 | Wilson et al. | 416/1 |

FOREIGN PATENT DOCUMENTS

| | | |
|---|---|---|
| JP | 2001-289149 A | 10/2001 |
| JP | 2004520531 A | 7/2004 |
| WO | 2006012509 A1 | 12/2006 |

OTHER PUBLICATIONS

Caselitz et al. "Reduction of Fatigue Loads on Wind Energy Converters by Advanced Control Methods" European Wind Energy Conference, Oct. 1997, pp. 555-558.*
ISR for PCT/JP2008/058559 mailed Aug. 5, 2008.

* cited by examiner

*Primary Examiner* — John Cottingham
*Assistant Examiner* — Steven Garland
(74) *Attorney, Agent, or Firm* — Kanesaka Berner & Partners

(57) ABSTRACT

It is an object to make it possible to completely or partially eliminate a yaw driving device and to reduce power consumption in a nacelle. A moment around a wind-turbine tower axis is calculated; an angle command value around the wind-turbine tower axis is calculated by adding a yaw-control command value to a reference command value for canceling out the moment; and a pitch angle command value of each wind turbine blade is set on the basis of the angle command value around the wind-turbine tower axis.

2 Claims, 6 Drawing Sheets

FIG. 6

| Ws \ θw | 0 | 2 | 5 | 10 | 20 | ... |
|---|---|---|---|---|---|---|
| 5 | 100 | ... | ... | ... | ... | ... |
| ⋮ | ... | | | | | |
| 25 | ... | | | | | |
| ⋮ | ... | | | | | |

WIND TURBINE GENERATOR AND YAW DRIVING METHOD FOR WIND TURBINE GENERATOR

RELATED APPLICATIONS

The present application is based on International Application Number PCT/JP2008/058559 filed May 8, 2008, and claims priority from Japanese Application Number 2007-133830 filed May 21, 2007, the disclosures of which are hereby incorporated by reference herein in their entirety.

TECHNICAL FIELD

The present invention relates to a wind turbine generator and a yaw driving method for a wind turbine generator.

BACKGROUND ART

Wind-turbine generating units having wind turbines and generators that are rotationally driven by the wind turbines are provided on wind turbine generators at the top of wind turbine towers in a manner capable of yaw rotation. The wind turbine generators are constructed such that the wind turbines receive wind force from the front and such that the wind-turbine generating unit yaws (turns in a substantially horizontal plane) with respect to the wind turbine tower in response to the wind direction.

In the wind turbine generators, yaw driving of the wind-turbine generating unit is carried out by securely disposing a ring gear on the tower, positioning a pinion that engages with the ring gear on the wind-turbine generating unit, and rotationally driving the pinion with a yaw motor (for example, see Patent Document 1).

Patent Document 1:
Japanese Unexamined Patent Application, Publication No. 2001-289149

DISCLOSURE OF INVENTION

Recently, along with a size increase in wind turbines, the sizes of the yaw motors, ring gears, etc. have also increased. A yaw motor is frequently activated to carry out yaw driving of the nacelle, and since the size is increased, there is a further increase in power consumption.

When the size and weight of the nacelle are to be decreased, reducing the size and weight of the structure of the yaw motor, etc. is an important issue.

It is an object of the present invention to provide a wind turbine generator and a yaw driving method for the wind turbine generator in which it is possible to reduce power consumption in a nacelle and to reduce the size of the nacelle.

To achieve the above-described object, the present invention provides the following solutions.

A first aspect of the present invention is a wind turbine generator including a load measurement unit configured to measure a load on each wind turbine blade; a moment calculating unit configured to calculate a moment around a wind-turbine tower axis by carrying out coordinate transformation of the load on each wind turbine blade measured by the load measurement unit; a component-command-value setting unit configured to calculate an angle command value around the wind-turbine tower axis by adding a yaw-control command value to a reference command value for canceling out the moment calculated by the moment calculating unit; and a pitch-angle-command setting unit configured to set a pitch-angle command value for each wind turbine blade on the basis of the angle command value around the wind-turbine tower axis.

A yaw-control command value is added to a reference command value for canceling out the load around a wind-turbine tower axis associated with each wind turbine blade in order to calculate an angle command value, and a pitch-angle command value of each wind turbine blade is set according to this angle command value; therefore, it is possible to turn (yaw) the nacelle around the wind-turbine tower, using a moment generated at the wind turbine blades corresponding to the yaw-control command value. In this way, by controlling the pitch angle of each wind turbine blade, the nacelle is turned using air force; therefore, it is possible to reduce the size and usage frequency of the yaw motor. As a result, the weight of the nacelle can be reduced, and it is possible to restrict power consumption by the yaw motor. It is also possible to eliminate the yaw motor. In such a case, further reduction in the size and weight of the nacelle is possible, and further reduction in power consumption is possible.

In the wind turbine generator, the yaw-control command value may be provided to correspond to the wind direction.

In this way, by providing a yaw-control command value corresponding to the wind direction, it is possible to turn the nacelle to an appropriate direction with respect to the wind direction.

In the wind turbine generator, the yaw-control command value may be set, for example, on the basis of a wind direction deviation.

A second aspect of the present invention is a yaw driving method for a wind turbine generator, the method including a step of measuring a load on each wind turbine blade; a step of calculating a moment around a wind-turbine tower axis by carrying out coordinate transformation of the load on each wind turbine blade; a step of calculating an angle command value around the wind-turbine tower axis by adding a yaw-control command value to a reference command value for making the moment zero; and a step of setting a pitch-angle control value for each wind turbine blade on the basis of the angle command value around the wind-turbine tower axis.

The present invention is advantageous in that power consumption in the nacelle can be reduced, and the size of the nacelle can be reduced.

BRIEF DESCRIPTION OF DRAWINGS

FIG. 6 illustrates an example of a yaw-control-command-value table.

BEST MODE FOR CARRYING OUT THE INVENTION

An embodiment of wind turbine generator according to the present invention and a yaw driving method for a wind turbine generator will be described below with reference to the drawings.

Figure 1:
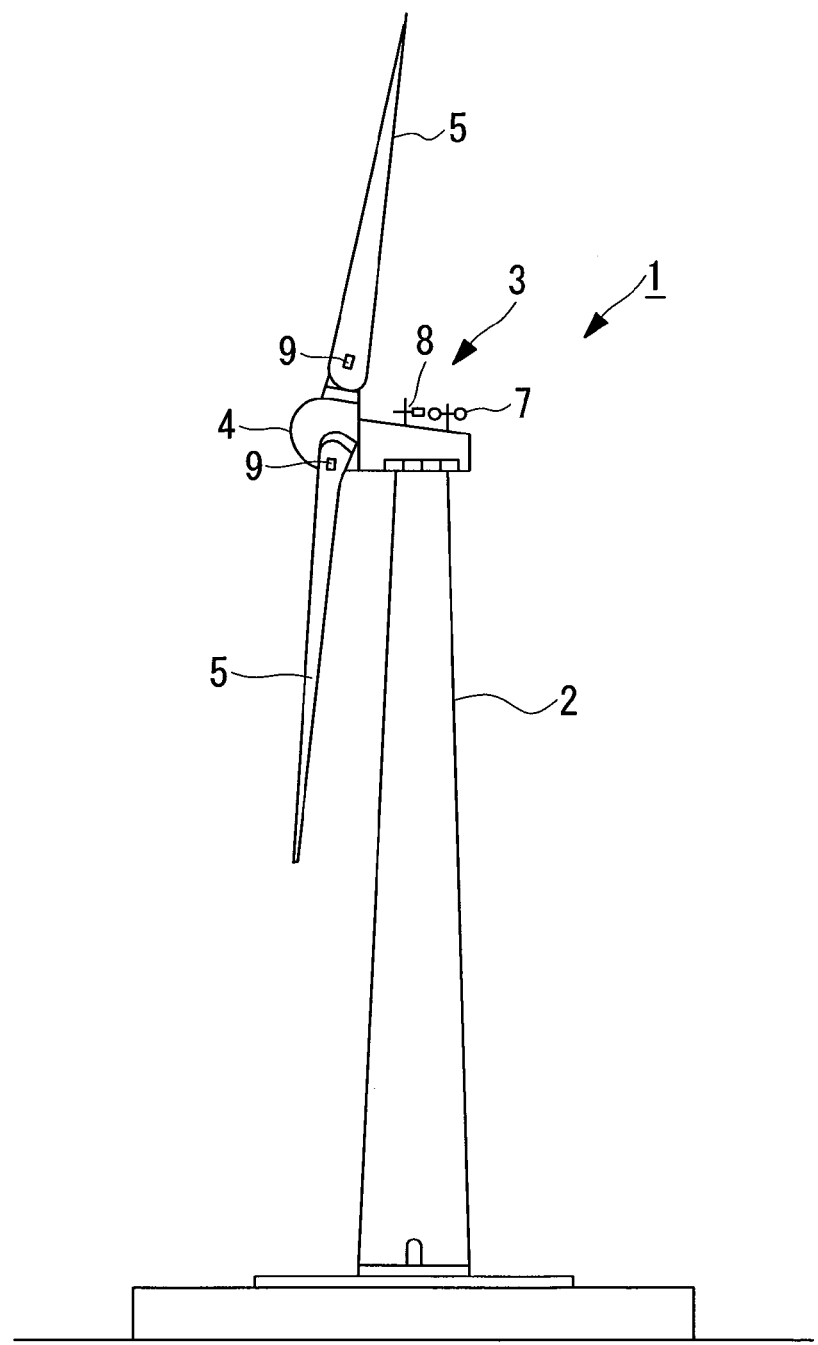
FIG. 1 illustrates the entire configuration of a wind turbine generator according to an embodiment of the present invention.

FIG. 1 is a block diagram illustrating, in outline, the configuration of the wind turbine generator according to this embodiment.

As shown in FIG. 1, a wind turbine generator 1 has a wind turbine tower 2, a nacelle 3 installed at the top of the wind turbine tower 2, and a rotor head 4 provided on the nacelle 3 in such a manner as to be rotatable around a substantially horizontal axis. A plurality of wind turbine blades 5 is attached to the rotor head 4 in a radiating pattern around the rotational axis thereof. As a result, the force of the wind striking the wind turbine blades 5 from the rotational axis direction of the rotor head 4 is converted to motive energy causing the rotor head 4 to rotate around the rotational axis. In this embodiment, a case in which three wind turbine blades 5 are provided will be described.

At appropriate positions (for example, at the top section) on the outer peripheral surface of the nacelle 3, an anemometer 7 that measures the wind speed in the surroundings and an anemoscope 8 that measures the wind direction are installed. Each of the wind turbine blades 5 is provided with a load measurement sensor (for example, an optical fiber sensor) 9 for measuring the load on the wind turbine blade 5.

The anemoscope 8 measures a wind-direction deviation and outputs the wind-direction deviation as a measured value. The load measurement sensor 9, for example, measures the deformation of the wind turbine blade 5 and measures the load corresponding to the amount of deformation.

Figure 2:
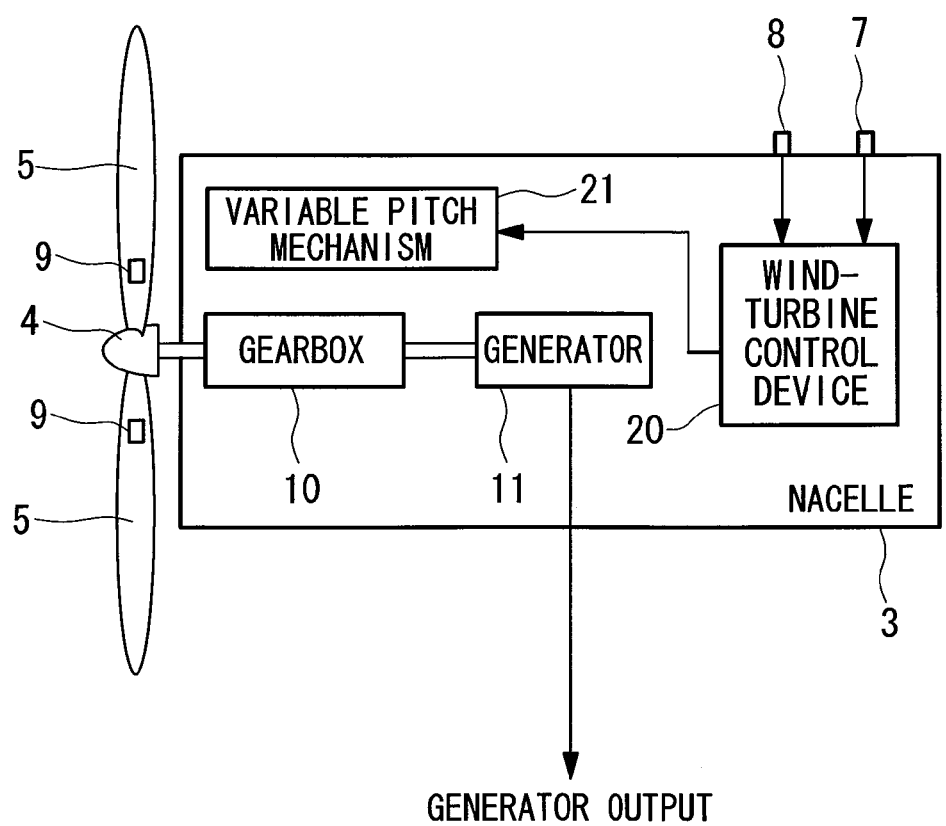
FIG. 2 illustrates, in outline, the configuration inside a nacelle.

As shown in FIG. 2, a generator 11 connected to the rotor head 4 via a coaxial gearbox 10 is installed inside the nacelle 3. In other words, by speeding up the rotation of the rotor head 4 with the gearbox 10 and driving the generator 11, a generator output is obtained from the generator 11. Moreover, a wind-turbine control device 20 that controls the operation of the wind turbine and a variable pitch mechanism 21 that receives a control signal from the wind-turbine control device 20 and changes the pitch angle of each wind turbine blade are provided inside the nacelle 3.

Load measurement values of the wind turbine blades 5 measured by the load measurement sensors 9, wind-direction deviation measured by the anemoscope 8, and wind speed measured by the anemometer 7 are input to the wind-turbine control device 20. The wind-turbine control device 20 sets the pitch angles of the wind turbine blades 5 on the basis of such input information and outputs control signals corresponding to the set pitch angles to the variable pitch mechanism 21. The variable pitch mechanism 21 changes the pitch angles of the wind turbine blades 5 on the basis of the control signals sent from the wind-turbine control device 20.

Figure 3:
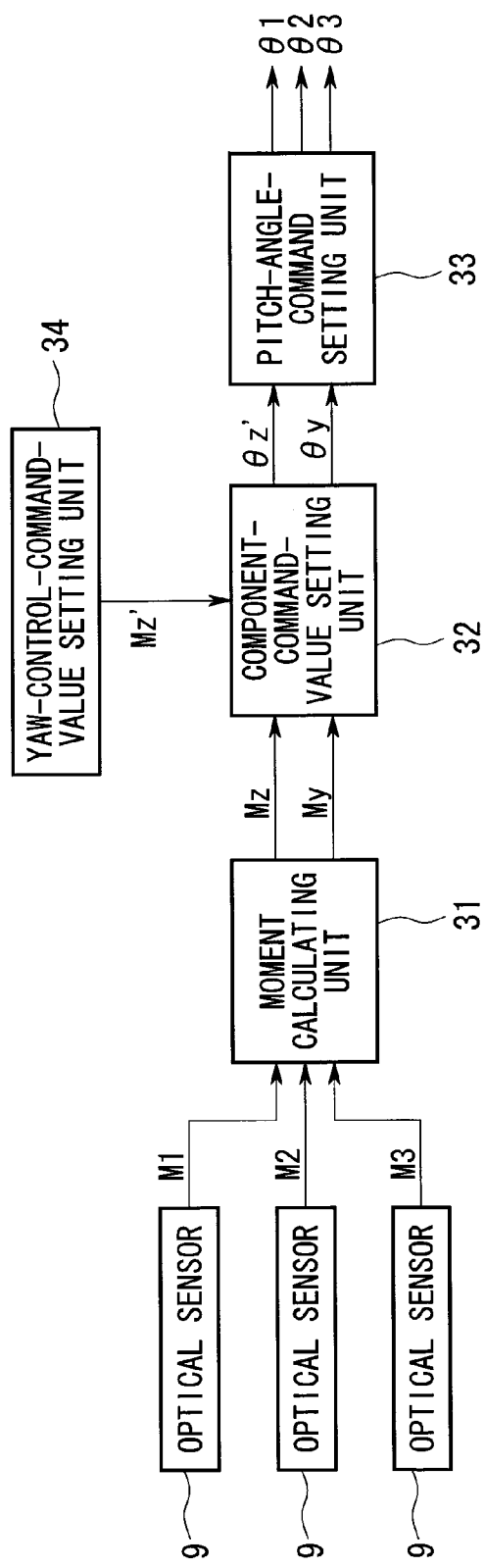
FIG. 3 illustrates control blocks associated with pitch-angle control, provided in the wind turbine generator according to an embodiment of the present invention.

FIG. 3 illustrates control blocks associated with pitch angle control, provided in the wind-turbine control device 20. As shown in FIG. 3, the wind-turbine control device 20 is equipped with a moment calculating unit 31, a component-command-value setting unit 32, a pitch-angle-command setting unit 33, and a yaw-control-command-value setting unit 34.

Figure 4:
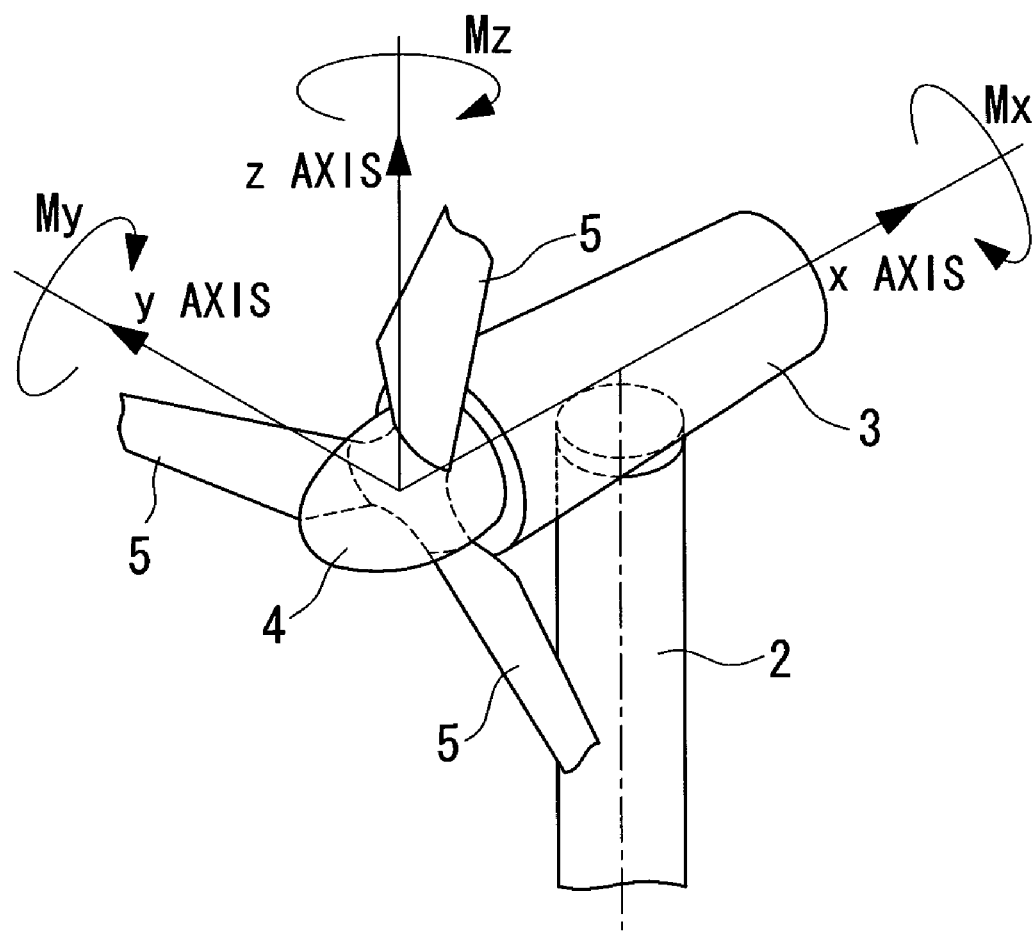
FIG. 4 illustrates the definition of x, y, and z axes.

The moment calculating unit 31 calculates a moment Mz around a z axis and a moment My around a y axis, which are shown in FIG. 4, by performing coordinate transformation of loads M1, M2, and M3 on the wind turbine blades 5 measured by the load measurement sensors 9. As shown in FIG. 4, the z axis is an axis parallel to the main axis of the wind turbine tower 2, the x axis is the rotational axis of the rotor head 4, and the y axis is an axis orthogonal to the z axis and the x axis.

Upon calculation of the moments My and Mz, the moment calculating unit 31 outputs them to the component-command-value setting unit 32. The component-command-value setting unit 32 sets an angle command value $\theta y$ associated with the y axis and an angle command value $\theta z$ associated with the z axis on the basis of the moments My and Mz calculated by the moment calculating unit 31.

More specifically, the component-command-value setting unit 32 determines a reference command value that cancels out the moment My around the y axis and sets this reference command value as the angle command value $\theta y$ around the y axis. The component-command-value setting unit 32 determines a reference command value that cancels out the moment Mz around the z axis, then adds a yaw-control command value Mz' input from the yaw-control-command-value setting unit 34 corresponding to this reference command value, and sets this value as an angle command value $\theta z'$ around the z axis. The component-command-value setting unit 32 outputs the angle command values $\theta y$ and $\theta z'$ to the pitch-angle-command setting unit 33.

The pitch-angle-command setting unit 33 performs coordinate transformation of the input angle command values $\theta y$ and $\theta z'$ to set the pitch angle commands $\theta 1$, $\theta 2$, and $\theta 3$ of the wind turbine blades 5 and outputs these to the variable pitch mechanism 21. In this way, the pitch angles of the wind turbine blades 5 are changed by the variable pitch mechanism 21 on the basis of the pitch angle commands $\theta 1$, $\theta 2$, and $\theta 3$. As a result, the load on each wind turbine blade 5 is reduced, and the nacelle 3 is turned around the z axis by an amount corresponding to the yaw-control command value Mz'.

Figure 5:
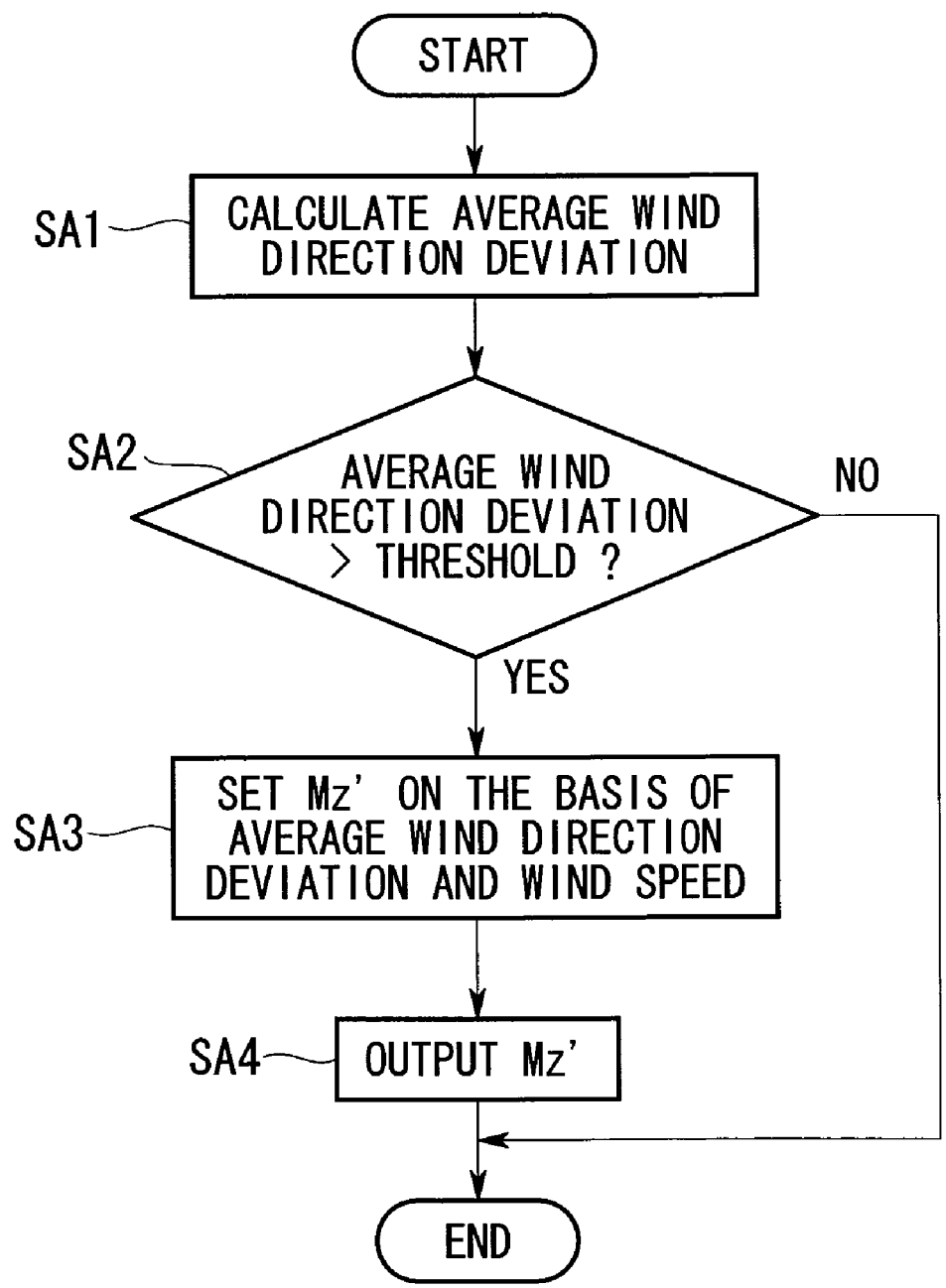
FIG. 5 is a flow chart illustrating the processing procedure carried out by a yaw-control-command-value setting unit according to an embodiment of the present invention.

Next, the above-described yaw-control-command-value setting unit 34 will be described with reference to FIG. 5. FIG. 5 is a flow chart illustrating the processing procedure carried out by the yaw-control-command-value setting unit 34. The processing illustrated in FIG. 5 is repeated at predetermined time intervals.

The yaw-control-command-value setting unit 34 calculates the average of wind direction deviations taken in a predetermined amount of time in the past, which are input from the anemoscope 8 (Step SA1 in FIG. 5). Subsequently, it is determined whether or not the average wind direction deviation calculated in Step SA1 is larger than a predetermined threshold (Step SA2 in FIG. 5). As a result, if the average wind direction deviation is equal to or smaller than the threshold, it is determined that the nacelle 3 is facing an optimal direction with respect to the wind direction, and the processing ends without carrying out yaw driving of the nacelle 3.

Figure 6:
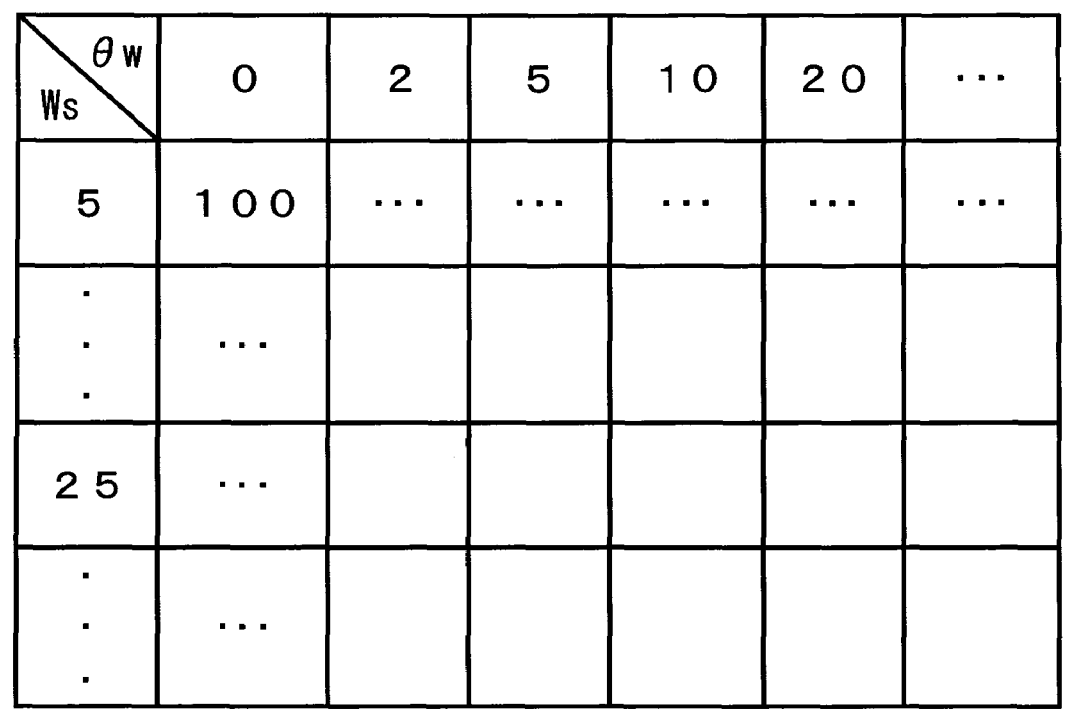

On the other hand, if the average wind direction deviation is larger than the threshold, it is determined that the nacelle 3 is not facing a desirable direction with respect to the wind direction, and the yaw-control command value Mz' is set (Step SA3 in FIG. 5). More specifically, the yaw-control-command-value setting unit 34 refers to the yaw-control-command-value table stored in advance and obtains the yaw-control command value Mz' specified by the average wind direction deviation calculated in Step SA1 and the wind speed input from the anemometer 7. FIG. 6 illustrates an example of the yaw-control-command-value table. As shown in FIG. 6, the yaw-control-command-value table contains yaw-control command values Mz' linked to combinations of wind speed and average wind direction deviation. The yaw-control-command-value setting unit 34 outputs the obtained yaw-control command value Mz' to the component-command-value setting unit 32 (Step SA4 in FIG. 5).

In this way, the nacelle 3 can be rotated around the z axis by an amount corresponding to the yaw-control command value Mz' by adding the yaw-control command value Mz' set in response to the wind speed and wind direction to the reference command value about the z axis.

As described above, with the wind turbine generator 1 according to this embodiment, it is possible to generate a moment corresponding to the yaw-control command value Mz' for each wind turbine blade 5 and rotate the nacelle 3 around the main axis of the wind turbine tower 2 using this moment. By controlling the pitch angle of each wind turbine blade 5 in this way, the nacelle 3 is turned using air force; therefore, it is possible to reduce the size of a yaw motor (not shown) located inside the nacelle 3. It is also possible to reduce the usage frequency of the yaw motor, thus making it possible to reduce the consumption output.

In the above-described embodiment, the yaw-control-command-value setting unit 34 obtains a yaw-control command value from a yaw-control-command-value table. Instead, however, the yaw-control command value may be obtained by providing an arithmetic expression containing average wind direction deviation and wind speed as parameters and by substituting the average wind direction deviation and the wind speed into this arithmetic expression.

Although embodiments of the present invention have been described above in detail with reference to the drawings, detailed configurations are not limited to the embodiments, and design modifications, etc. within the scope of the invention are also encompassed.

The invention claimed is:

1. A wind turbine generator, comprising:
    a load measurement unit configured to measure a load on each wind turbine blade;
    a moment calculating unit configured to calculate a moment around a wind-turbine tower axis by carrying out coordinate transformation of the load on each wind turbine blade measured by the load measurement unit;
    a component-command-value setting unit configured to calculate an angle command value around the wind-turbine tower axis by adding a yaw-control command value specified by a yaw-control-command-value setting unit to a reference command value canceling out the moment calculated by the moment calculating unit; and
    a pitch-angle-command setting unit configured to set a pitch-angle command value for each wind turbine blade on the basis of the angle command value around the wind-turbine tower axis;
wherein
    the yaw-control command value is provided by the yaw control command value setting unit responsive to an average wind direction deviation being larger than a predetermined threshold; and
    the yaw-control command value is specified by the average wind direction deviation and a wind speed referencing a value stored in a yaw-control-command-value table.

2. A yaw driving method for a wind turbine generator, the method comprising:
    measuring a load on each wind turbine blade;
    calculating a moment around a wind-turbine tower axis by carrying out coordinate transformation of the load on each wind turbine blade;
    calculating an angle command value around the wind-turbine tower axis by adding (i) a yaw control command value that is provided responsive to an average wind direction deviation being larger than a predetermined threshold and that is specified by the average wind direction deviation and a wind speed by referring to a stored yaw-control-command-value table to (ii) a reference command value for making the moment zero; and
    setting a pitch-angle control value for each wind turbine blade on the basis of the angle command value around the wind-turbine tower axis.

* * * * *